(12) United States Patent
Barlow et al.

(10) Patent No.: US 8,112,677 B2
(45) Date of Patent: Feb. 7, 2012

(54) METHOD OF DEBUGGING MULTIPLE PROCESSES

(75) Inventors: Stephen John Barlow, Conington (GB); Andrew James Bower, Cambridge (GB); Andrew Brian Thomas Hopkins, Folkestone (GB); Klaus Dieter McDonald-Maier, Harwich (GB)

(73) Assignee: UltraSoc Technologies Limited, Cambridge (GB)

( * ) Notice: Subject to any disclaimer, the term of this patent is extended or adjusted under 35 U.S.C. 154(b) by 0 days.

(21) Appl. No.: 12/713,880

(22) Filed: Feb. 26, 2010

(65) Prior Publication Data

US 2011/0214023 A1    Sep. 1, 2011

(51) Int. Cl.
*G06F 11/00* (2006.01)

(52) U.S. Cl. ............. 714/46; 714/38.1; 714/45; 714/57; 717/124; 717/125; 717/127; 717/128

(58) Field of Classification Search ................ 714/38.1, 714/45, 46, 57; 717/124, 125, 127, 128
See application file for complete search history.

(56) References Cited

U.S. PATENT DOCUMENTS

| | | | | |
|---|---|---|---|---|
| 5,410,686 | A * | 4/1995 | Kish ........................ | 714/30 |
| 7,120,901 | B2 * | 10/2006 | Ferri et al. .................. | 717/128 |
| 7,213,113 | B2 * | 5/2007 | Sahin et al. .................. | 711/162 |
| 7,236,900 | B2 * | 6/2007 | Hagen et al. .................. | 702/67 |
| 7,509,539 | B1 * | 3/2009 | Denefleh et al. ............ | 714/48 |
| 7,665,002 | B1 | 2/2010 | White et al. | |
| 7,802,233 | B2 * | 9/2010 | Weinert et al. ............... | 717/125 |
| 7,853,928 | B2 * | 12/2010 | Attinella ...................... | 717/128 |
| 7,987,393 | B2 * | 7/2011 | Sohm et al. .................. | 714/45 |
| 2002/0075326 | A1 * | 6/2002 | Allen ........................... | 345/853 |
| 2003/0110420 | A1 | 6/2003 | Smith et al. | |
| 2006/0059286 | A1 | 3/2006 | Bertone et al. | |
| 2006/0130000 | A1 * | 6/2006 | Miyao et al. ................ | 717/128 |
| 2006/0259827 | A1 * | 11/2006 | Sohm et al. .................. | 714/38 |
| 2006/0259831 | A1 * | 11/2006 | Sohm et al. .................. | 714/45 |
| 2007/0220360 | A1 * | 9/2007 | Weinert et al. ............... | 714/45 |
| 2008/0184150 | A1 | 7/2008 | Minato et al. | |
| 2008/0209176 | A1 | 8/2008 | Singh et al. | |
| 2008/0244531 | A1 * | 10/2008 | Schmelter et al. ........... | 717/128 |
| 2011/0138236 | A1 * | 6/2011 | Park et al. .................... | 714/57 |

FOREIGN PATENT DOCUMENTS

| | | |
|---|---|---|
| CN | 101251819 | 8/2008 |
| JP | 57164362 | 10/1982 |
| JP | 58129559 | 8/1983 |
| WO | WO 2008/061067 | 5/2008 |
| WO | WO 2010/021778 | 2/2010 |

* cited by examiner

*Primary Examiner* — Robert Beausoliel, Jr.
*Assistant Examiner* — Joshua P Lottich
(74) *Attorney, Agent, or Firm* — Dilworth Paxson LLP; Philip J. Foret

(57) ABSTRACT

A method of debugging a multiple concurrent processes comprising: obtaining, from each process, a plurality of events that have been processed and, if no time information is associated with each event, associating time information therewith; causing a display to display the events such that an event that has occurred in a first portion of the display associated with a first process at a first time is aligned with an event in a second portion of the display associated with a second process that has occurred at a similar time to the first time. To be accompanied, when published, by FIG. 5 of the drawings.

23 Claims, 5 Drawing Sheets

| Proc A | Proc B |
|---|---|
| +afunc1 | +bfunc1 |
| +afunc2 | +bfunc2 |

Fig. 9

| Proc A | Proc B |
|---|---|
| +afunc1 | +bfunc1 |
| -afunc2 | |
|    line1 | +bfunc2 |
|    line2 | |
|    line3 | |
|    line4 | |

Fig. 10

| Proc A | Proc B |
|---|---|
| +afunc1 | +bfunc1 |
| -afunc2 | |
|    line1 | -bfunc2 |
|    line2 |    line1 |
|    line3 | |
|    line4 |    line2 |
| |    line3 |

Fig. 11

| Proc A | Proc B |
|---|---|
| +afunc1 | -bfunc1 |
| -afunc2 |    line1 |
|    line1 |    line2 |
| | -bfunc2 |
|    line2 |    line1 |
|    line3 |    line2 |
|    line4 |    line3 |

Fig. 12

METHOD OF DEBUGGING MULTIPLE PROCESSES

FIELD OF THE INVENTION

This invention relates to a method of debugging multiple processes together with related hardware.

BACKGROUND OF THE INVENTION

It is known for electronic systems to have multiple processes running thereon. These multiple processes can arise due to there being multiple processors, multiple physical cores on a single processor, multi-threading on a single core, or the like.

However the multiple processes arise it means that more than one set of instructions is being processed at any one time. Processing of more than one set of instructions may mean that more than one instruction is executed at any one time but also generally means that execution of instructions from the plurality of threads is interleaved. As such, and considering a time-line, one or more instructions is executed from one of the threads.

Whilst it is known for each process to generate debug information, it can be difficult to debug the processes on such a system and in particular if the system is embedded. Typically it can be difficult to determine the current status of each individual process and work out which process is doing what at any one moment in time.

SUMMARY OF THE INVENTION

Accordingly, embodiments of the invention provide a view in which concurrent instructions are displayed adjacent one another.

BRIEF DESCRIPTION OF THE DRAWINGS

There now follows by way of example only a detailed description of embodiments of the present invention with reference to the accompanying drawings in which FIG. 1 schematically shows the internals of a system for which embodiments of the invention may be utilised;

FIG. 9 shows a portion of a display from a second embodiment of the invention;

FIG. 10 shows the portion of FIG. 9 with an area thereof expanded;

FIG. 11 shows the portion of FIG. 10 with a further area thereof expanded;

FIG. 12 shows a further view of the portion of the display of FIGS. 9 to 11;

DETAILED DESCRIPTION OF THE DRAWINGS

Figure 1:
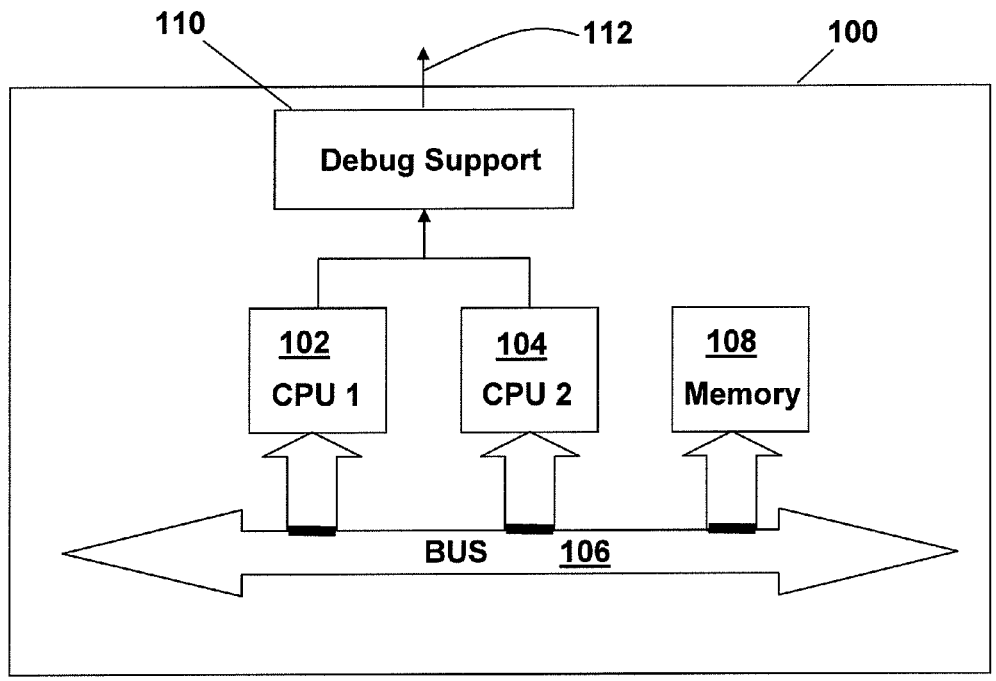

FIG. 1 schematically shows an example of a system 100 on which embodiments of the invention may be used to analyse debug information, also known as trace information, generated from multiple processors 102, 104. Each of these processors communicate, through a system bus 106, to shared resources such as system memory 108, bulk storage devices, I/O controllers, or the like.

In other embodiments, the trace information may be generated from multiple processes running on a single processor.

Embodiments of the invention may support general purpose and signal processor architectures (including single-issue; superscalar; and VLIW); and Single Instruction Multiple Data (SIMD) architectures. Pure Multiple Instruction Multiple Data (MIMD) architectures constitute multiple processor cores, as do any virtual processor cores created by special threading arrangements such as chip-multi-threading and hyper-threading and such like, each of which can also be processed by embodiments of the invention. It is also possible for some embodiments to trace modules that are not conventional processors, which may have other control flow and state information that can be listed, exploiting hierarchical structure similar to an instruction set-based processor, e.g. Data transfers shown beneath entries for specific, possibly hierarchical, machine states. As such, embodiments of the invention may process trace information from processes which generate time stamped data and references to processors hereinafter should be taken to mean a process (whether physical or simulated) which can generate such trace information.

Further, each of the processors 102, 104 is connected to a debug support unit 110 which generates trace information from information sent thereto by the processors 102, 104. As such, the debug support unit 110 generates a stream of trace packets which are multiplexed from the processors. This trace information is made available on an output 112.

In some embodiments there may be instrumentation trace that is programmatically generated by software processes, including operating system software, and passed to the debug support 110 for inclusion with any other trace streams as a way to include high-level information in the trace. In such embodiments, the trace information generated by the debug support 110 will likely include the instrumentation trace in addition to other trace information. In such embodiments, the debug-support 110 may or may not add time stamp information to the instrumentation trace. The high level processes may add time stamp information.

The debug system is universally applicable to any processor be that a small state-machine, an 8-bit or smaller processor core through to processors with wider instructions, e.g. 16-bit, 24-bit, 32-bit, 48-bit and 64-bit or wider. Products in the market place include: Reduced Instruction Set Computing (RISC) cores such as the ARM 7,9,11 and Cortex families of 16/32-bit processor, the MIPS16, MIPS32 and MIPS64 families, SuperH RISC engine families, processors implementing the PowerPC™ instruction-set architectures and various SPARC and UltraSPARC architecture processors; Complex Instruction Set Computing (CISC) cores such as the Renesas R32C/100, Intel Atom processor, and Pentium families; MicroChip PIC™ family microcontrollers of various instruction widths; Texas Instruments' C6000 family of Digital Signal Processors (DSP); Analogue Devices' Blackfin™ and SHARC™ families of DSP; Tilera Tile64™, TilePro™ and TileGX™ families of many-core processor; and the various Xtensa families of configurable processor from Tensilica. Examples of modules, include the arbiters and modules of interconnect (bus/network-on-chip) architectures like the ARM AMBA™, IBM CoreConnect™, Sonics' networks and similar; Memory Controller modules; Fast peripherals like Ethernet network controller modules, Direct Memory Access (DMA) modules and such like; Coprocessor modules that perform bulk arithmetic operations; software defined radio processors and their analogue transceivers.

Analogue modules and signals, including power line voltage and current, may also be traced by way of feedback from digital control circuits or by sampling of their signals and conversion to a digital value using a converter located internally or externally to the system 100. Likewise optical signals may also be captured using a suitable detection and receiver arrangement. Systems may contain a mixture of processors and modules; the Texas Instruments OMAP3 family combine a Cortex A8 processor core from ARM with their own C6000 DSP core plus many other modules. Numerous other applicable processors and modules are also applicable and will be apparent to anyone skilled in the art.

In some embodiments, the debug-support 110 is arranged to monitor the system bus to ascertain accesses thereto and/or to monitor instruction execution. Further some embodiments, of the debug-support may output the trace information via a dedicated trace port and/or a small-scale trace stored in a buffer. In some embodiments, the buffer is accessible via a boundary scan techniques such as JTAG (Joint Test Action Group as specified in IEEE 1149.1).

In the example shown the system 100 shown is a so-called embedded system which may have limited or no display facilities; limited or no user input facilities; real-time execution requirements that prevent the system from being stopped or interrupted; located in a difficult to access location such as within a gearbox or in a remote location like outer space. As such, debugging of the processors 102, 104 is generally performed via information that is passed out of the output 112, which may be electrical, optical, radio frequency or electromagnetic. Such an approach is generically applicable and could be added to any computer system, embedded or otherwise, including PCs, workstations, servers, telecommunications processor systems, mainframes and such like without further invention.

Figure 2:
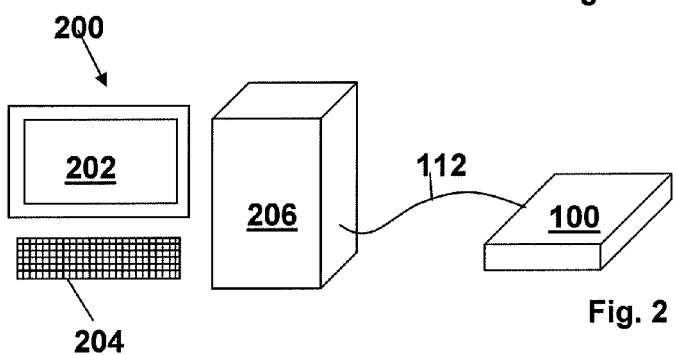
FIG. 2 shows a computer system connected to the system of FIG. 1.

FIG. 2 shows a computer system 200 to which the output 112 has been connected. The computer system 200 comprises a display 202, in this case an LCD (Liquid Crystal Display) monitor, a keyboard 204 and processing circuitry 206. It will be appreciated that other display means such as LEP (Light Emitting Polymer), CRT (Cathode Ray Tube) displays, projectors, holographs, televisions and the like may be equally possible.

Typically, embodiments of the invention will be utilised on the computer system 200 such that the output therefrom is displayed on the display 202.

The processing circuitry 206 comprises a processor, a hard drive, memory, an I/O subsystem and a display driver which all communicate with one another, as is known in the art, via a system bus. The processor typically comprises at least one INTEL™ PENTIUM™ series processor, (although it is of course possible for other processors to be used) and performs calculations on data. Other processors may include processors such as the AMD™ ATHLON™, POWERPC™, DIGITAL™ ALPHA™, and the like. The processing circuitry 206 may optionally comprise one or more programmable logic type units such as Field Programmable Gate Arrays, either as the main processor or in supplement to a first processor arrangement. The processing circuitry 206 may be a distributed arrangement with some processors located separately from one another communicating as is known in the art.

The keyboard 204 provides an input to the processor, however other forms of input such as a touch screen, mouse, voice recognition or brain computer interface provide useable alternatives. Other devices such as CDROMS, DVD ROMS, scanners, etc. could be coupled to the system bus and allow for storage of data, communication with other computers over a network, etc.

The I/O (Input/Output) subsystem is arranged to receive inputs from the keyboard 204 and from the processor and may allow communication from other external and/or internal devices. The display driver allows the processor to display information on the display 202.

The processing circuitry 200 could have the architecture known as a PC, originally based on the IBM specification, but could equally have other architectures. The processing circuitry 200 may be an APPLE™, or may be a RISC system, and may run a variety of operating systems (perhaps HP-UX, LINUX, UNIX, MICROSOFT™ NT, AIX™, OSX™ or the like). The processing circuitry 200 may also be provided by devices such as Personal Digital Assistants (PDA's), notebook computers, a logic analyzer, an application specific embedded device/instrument or the like.

It will be appreciated that although reference is made to a memory within the processing circuitry 200 it is possible that the memory could be provided by a variety of devices. For example, the memory may be provided by a cache memory, a RAM memory, a local mass storage device such as the hard disk, any of these connected to the processing circuitry 200 over a network connection. However, the processor can access the memory via the system bus, accessing program code to instruct it what steps to perform and also to access data.

As the processors 102, 104 within the apparatus 100 execute instructions within the memory 108 trace information (which is generally packetised information) is generated by the debug support 110, which may include a buffer memory, and output on the output 112.

FIG. 1 shows the presence of two processor 102, 104 which in some embodiments may themselves comprise multiple cores, and/or be arranged to execute multiple threads of instructions. Indeed, in other embodiments, only a single processor 102, 104 may be provided although that processor may have multiple cores and/or be arranged to execute multiple threads. As such, the or each processor concurrently processes multiple instruction sets, whether those instructions sets are generated by multiple threads, multiple cores, multiple processors, etc.

Thus, and as explained with reference to FIG. 3, concurrent execution of multiple instruction sets does not mean that instructions are necessarily executed at the same time (although it can do). The Figure shows two time lines. The top line represents when processor 102 is executing an instruction and the bottom line represents when processor 104 is executing an instruction. In this embodiment each or the processors 102, 104 is clocked from the same clock and so are synchronised. However, in other embodiments this need not be the case.

Thus, it can be seen that time period 1 is only period shown in which instructions are executed concurrently. In the other time periods (2-7) only one of the processors 102, 104 is executing an instruction.

However, for some embodiments of the invention it is convenient to assume that instructions are not executed simultaneously. As such, instructions can be time-stamped with a fraction of a clock-cycle (which may be arbitrarily generated)

in order to differentiate concurrent instructions. Thus, in the example, the embodiment might assign the instruction from processor 102 that occurs in time period 1 with a time-stamp of 1.0 and it may assign the instruction from processor 104 that occurs in time period 1 with a time-stamp 1.1. Subsequently, the instruction that occurs on processor 104 that occurs in time period 2 is assigned time-stamp 2.0, etc. Such a method and similar methods helps to ensure that instructions can be differentiated from one another regardless of their actual time of execution.

This output is received by the processing circuitry 206 where it is time-stamped and stored within the memory of the processing circuitry 206. The processing circuitry 206 de-multiplexes the packets into a separate thread for each source processor 102, 104 transforms the trace packets, with the aid of a disassembly from the debugger (or similar), executable file (such as an ELF (Execution and Linking Format) file debug information created by assembler, compiler or linker tools (or similar) and source code into an ordered tree structure stored in the memory of the processing circuitry 206, representing a logical structure for the control flow. Such an ordered tree structure is generated for each process for which trace information is provided.

Other embodiments may provide additional circuitry between the apparatus 100 and the processing circuitry 206. Such additional circuitry may be arranged to condition the output, buffer the output, isolate the output or the like.

In other embodiments timestamps may be generated at the point of origin inside the apparatus 100, during propagation within the apparatus 100, at a point of internal buffering within the apparatus 100, at the point where the or each packet leaves the apparatus 100, upon collection by an external trace probe or buffer (such as positioned between the apparatus and the processing circuitry), or the timestamp may be synthesised based on the packet sequence (as is the case in the embodiment being described). When synthesising timestamps knowledge of the underlying architecture may be utilised to increase accuracy. For example, knowing the likely propagation delay from the execution of the instruction that generated the trace information packet to the point at which the time stamp is added is likely to increase accuracy of the time stamp if this is allowed for.

Program code within the processing circuitry 206 is executed by the processor to cause the data received from the apparatus 100 to be displayed on the display 202. The skilled person will appreciate that whilst this embodiment is describing the program as being executed from the memory of the processing circuitry as software, it could also be implemented as firmware or indeed as hardware.

FIGS. 4 to 8 show a first embodiment of how the processing circuitry 206 causes the trace information to be displayed on the display 202.

The skilled person will appreciate that the underlying trace information logs low-level operations such as instructions, changes of state and data accesses that the monitored processors 102, 104 perform each of which may be thought of as an event. Alternatively, the term statement may be appropriate. The term event may be thought of as the lowest granularity of the collected trace information. The actual content of an event depends upon the source that is being traced. For example, a state machine has states each of which may be considered an event. An analogue signal generates samples each of which may be considered an event. Each instruction execution or state change, etc. may be described as an event.

Embodiments of the invention may then be used to display structure within the collected traced events, such as the hierarchical partitioning effect that call and return instructions have. Where a procedural high-level language is used (including object oriented) or assembly language with a notion of procedures, the structure of the trace information can be made more meaningful by embodiments of the invention to a user by presenting it with symbolic data. The tree view and trace decoder are module and language independent; for processors, the instruction stream can be used and augmented with symbols where available.

Each of FIGS. 4 to 8 represent the display 300 that would be shown on the display 202 and show two columns of data. A first column 302 shows trace information from the first processor 102 whilst the second column 304 shows trace information from the second processor 104. Thus the first column provides a first portion of the display which is associated with the first process (the processor in this embodiment) and the second column provides a second portion of the display which is associated with the second process (again a processor in this embodiment).

Other embodiments of the invention may cause the display to show further portions wherein each portion shows data associated with a process.

In other embodiments, the first and/or second portions of the display need not be columns and may be any other convenient representation. For example, the first and/or second and/or additional portions may be a row, a perspective view, a pie chart, a grid, a diagram or schematic with an appropriate format for the information to be displayed such as a state diagram for a state machine or a bitmap type image for an image processor or a structured frame for a network processor, or the like. FIGS. 4 to 8 represent a display with fixed height rows of events, however this need not be the case, as some alternative representations, such as charts and diagrams may be irregular in size, so may require additional display space.

Additional display space may be gained by increasing the row height as necessary to display the event and by using annotation lines, such as arrowed lines, that place large and/or irregular sized events in sequence with other events in other portions of the display. In some embodiments a further portion of the display maybe used to show information displayed by the first and/or second portion of the display in an alternative way, for example, the first portion may show events relating to the event execution and data accesses of an image processor while the further portion shows a bitmap of the image being processed at regular intervals of time and/or progress in alignment with the structure displayed in the first portion and derived from the same and/or different trace data.

In a system designed to have high-integrity, a plurality of processes process the same input data, concurrently and/or sequentially so that a system may be sure that it has arrived at the correct result for given its inputs and has not been corrupted by a failure and/or transient event, such as a single event upset caused by exposure to ions or electromagnetic radiation; i.e. there is a higher belief in the result when compared to performing the process a single time. As such, the first and second processes are substantially the same. In one embodiment of the invention the plurality of processes and their results are displayed in different portions of the display (for example, the first, second and/or additional portions of the display) with any differences in timing and/or sequence of event activity indicated, such as by shading, colouring, annotation lines, annotation icons or similar. When the processes to be compared are in fact multiple threads executing at different times, the time displayed by the display is a relative time, typically adjusted to zero, which has the effect that each process is displayed to start at the same time.

In other embodiments, additional portions, which may be columns, may be provided to show trace information from additional processors.

Rows of the display 300 are aligned to reflect the passage of time so that increasing time is shown lower down the display 300. As such, the alignment of the trace information (i.e., of events) in the two columns shows the relative timing of trace information within the two columns 302, 304—specifically, since items may contain rolled-up information and represent a range of time, the relative timing of the START of the items. The positioning of the trace information within the two columns is derived from the time stamp information that is added to the trace information.

Thus, events that occur at similar times are aligned by the row in which that event and/or function is displayed. Aligned may not necessarily mean within the same row and may mean on adjacent row. Indeed, some embodiments of the invention may align similar time stamped events on the same row whereas other embodiments may not do this.

Figure 3:
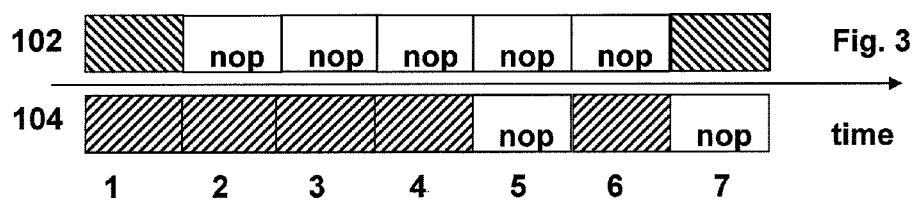
FIG. 3 shows a time line showing multiple execution of instructions.

Referring to FIG. 3 the skilled person will appreciate that the time information may be the actual time of occurrence or a pseudo-time that has been assigned to an instruction (or other occurrence).

Each column 302, 304 may be thought of as a tree comprising at least one and generally a plurality of nodes; alternative language may refer to the nodes as leaves of the tree. The tree shows the events that have been collected from the trace information and each event represents a node of the tree and some of these nodes may represent leaves of the tree.

Figure 4:
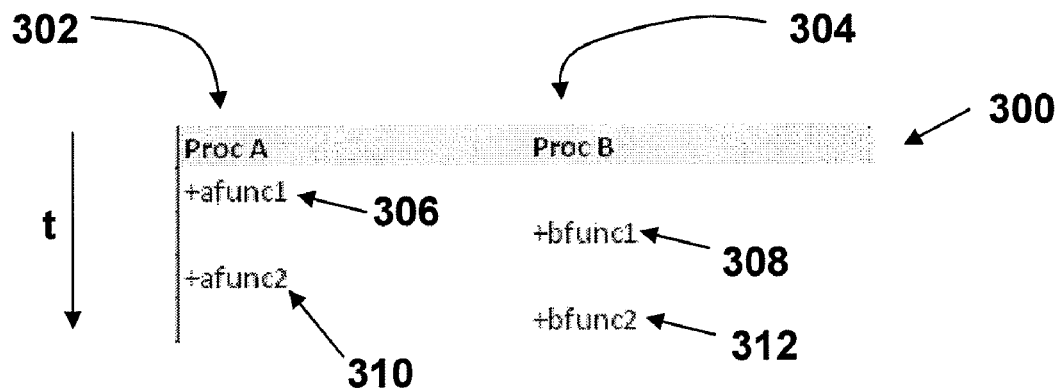
FIG. 4 shows a portion of a display from a first embodiment of the invention.

In FIG. 4, four such nodes 306, 308, 310, 312 can be seen. As denoted by the '+' sign to the left of each node in the Figure each node can be expanded to provide further information and FIG. 4 shows each node fully collapsed and as such the display is as compact as possible. In FIG. 4 each node represents an event, which in this embodiment is a function within a high-level language.

Although the Figure shows only two levels of nesting the skilled person will appreciate that this may be extended to any number of levels. For example, there may be 3, 4, 5, 6, 7, 8, 10, 15 or more levels.

The visual tree structure is generated from the tree stored within the memory with the same logical structure that was previously generated. As described earlier, the tree stored in the memory is generated by interpreting events within the incoming trace information in conjunction with empirical knowledge of the structure of the program being run, such as from debug information contained within a file or similar, for example the executable file, associated with the program that is held within the memory of the processing circuitry 200 in some embodiments and/or within the memory of the apparatus 100 in alternative embodiments.

In one embodiment the structure used is function calls, corresponding to changes in control flow, nested from the top level to two levels above the most nested leaves of the tree; each Function call may nest source code lines and/or function calls; source code lines are the level above the leaves, corresponding to lines from source or assembly files, source code lines nest at least one trace instruction; trace instructions are the leaves, corresponding to executed addresses. Trace instructions may be associated with one or more trace data objects, which represent data accesses that have been traced. Each of these levels may be thought of as an event.

Figure 5:
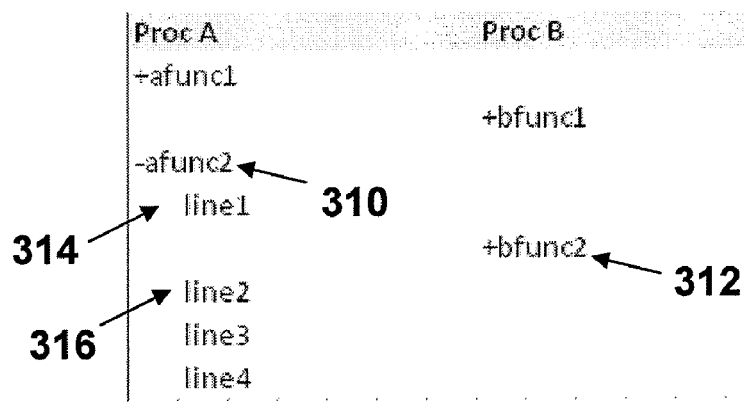
FIG. 5 shows the portion of the display of FIG. 4 with areas thereof expanded.

Each node can be expanded as is exemplified in FIG. 5 in which the node 310 has been expanded. As such, the function represented by the event has been broken down to show each of the source code events that are performed to execute that function; for example, a function to add two integers 'V' and 'W' and return the result, written using the well known 'C' language, may contain a source code event "return V+W;". Again, the nodes showing the events are ordered according to the time stamp data associated therewith and it can be seen that some of the source code events (eg 314) occur before the start of function 312 in the second column 304 and some source code event (eg 316) start after the start of function 312. As such, the vertical position on the view gives an indication of the relative timing of each event between the processors 102, 104.

Within the software representation, state indicating whether a given node is currently expanded, and therefore whether its children nodes should be shown, needs to be stored either in a separate data structure such as a tree of expanded nodes with no data other than their structure, corresponding to the structure of the original tree, or in the tree nodes themselves. In this embodiment such nodes (containing expansion state) are referred to as stateful tree nodes to reflect their dual purpose of representing the trace information and the state of a particular displaying of that state information; this is an optimisation to keep spatial locality high and memory usage low.

In the embodiment being described, the view is generated by a function which converts from output row numbers to a (node reference, tree reference) tuple. This function iterates through the previously-generated array of such tuples, skipping nodes which are under unexpanded nodes, counting output rows until the target output row is found and the relevant node returned.

A cache can be maintained to map output row numbers to (node reference, tree reference) tuples in order to accelerate such lookups when they have already been calculated. If the codomain of the mappings includes internal state for the above function then lookups for output row numbers higher than output rows already cached can be accelerated substantially.

The cache is invalidated when the expansion state (i.e., moving from collapsed to expanded or vice versa) or tree structure changes, although this may be optimised to invalidate only past a certain point when an efficient means is available to obtain a output row number from a node, such as when reverse mappings are also maintained. The function to map from output row numbers to nodes iterates over both the output rows and the globally-ordered list of nodes, keeping track of the current path through each of the trees as it goes.

The state between output rows is:
integer: the index into the globally-sequenced list of the last node checked and for each tree:
integer: the highest level (closest to root) of the tree at which there is a collapsed node
boolean: whether there are any collapsed nodes in the current path
integer: the index into the globally-sequenced list of the latest current node
boolean: whether this tree has a node in the current output row or not [by being a boolean for each tree rather than just an integer identifying the tree, this facilitates the implementation of the 'compact view' variation of the embodiment, described later]. Such a 'compact view' embodiment thus may align events and/or functions that occur at a similar time on the same row of the display.

In order to allow the iteration to resume for subsequent requests without starting from the beginning, the state between iterations can be saved as the codomain of the cached mapping.

Output rows are iterated-over more slowly than the globally-ordered list of nodes. For every node in the globally-ordered list, if it is under a collapsed node then it is ignored and the next node is checked without the output row number incrementing.

Time stamp ranges for collapsed nodes can be calculated by inspecting the first and last leaf nodes in the tree. This is an operation whose execution time is proportional to the logarithm of the depth of the tree as is know from computational complexity theory. In the embodiment being described this can be achieved by checking all leaf nodes for first and last times or, since all leaves of the tree are inherently ordered, when a node's first and last children are both leaves, simply by checking the timestamp of the first and last child.

Figure 6:
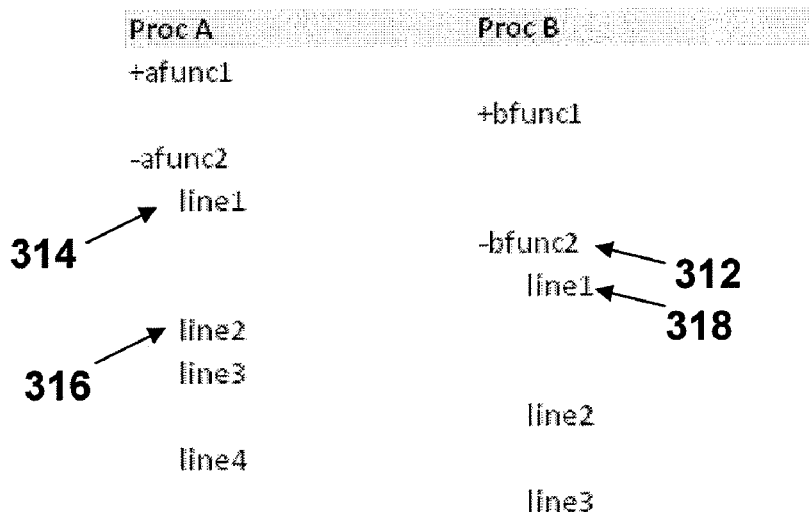
FIG. 6 shows the portion of the display of FIG. 4 with further areas thereof expanded.

FIG. 6 shows a further view in which the second function 312 in the second column 304 has now been expanded. As such, it can be seen that the leafs are now interleaved to reflect the time at which a given instruction occurs. So for example, it can been seen that instruction 318 in the second column 304 occurred between instructions 314 and 316.

Figure 7:
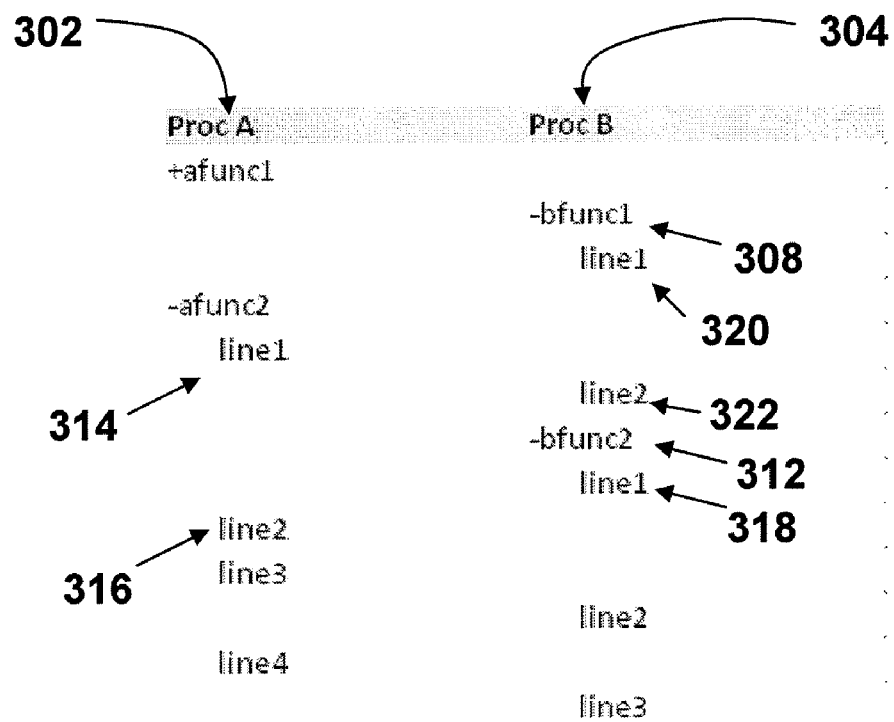
FIG. 7 shows the portion of the display of FIGS. 4 to 6.

FIG. 7 shows a further view in which the first function 308 in the second column 304 has been expanded to reveal its constituent instructions 320, 322. It should be noted that the first column 302 has had extra blank lines added in order to keep the relative position between the instructions 314, 316 and 318.

Figure 8:
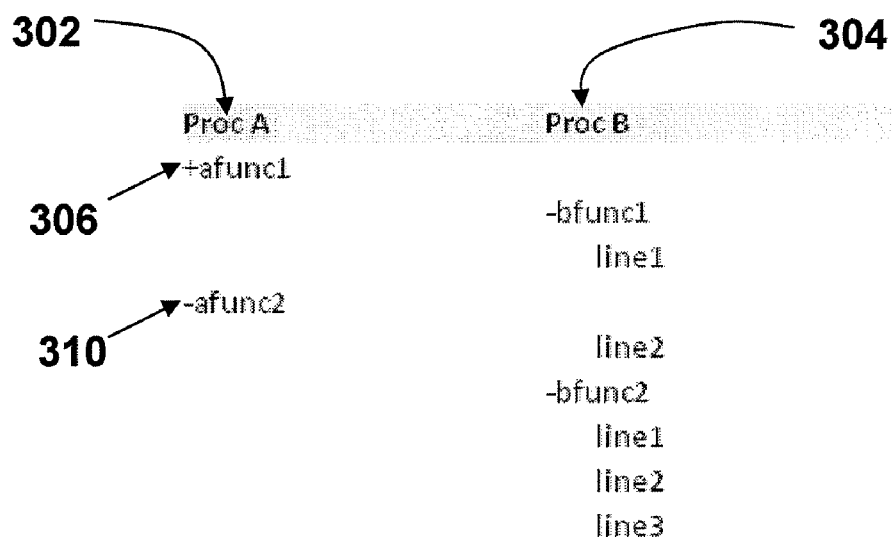
FIG. 8 shows a further view of the portion of the display of FIGS. 4 to 7.

FIG. 8 shows a further view in which the functions 306, 310 referred to by the events of the first column have been collapsed. It will therefore be seen that blank lines in the second column 304 have now been removed to the minimum needed in order to maintain the relative ordering with those in the first column 302.

Thus, it will be seen that the functions events can be expanded and collapsed to reveal and hide, respectively, the events that go to make up that function. The embodiment being described ensures that the events and/or functions remain aligned by arranging that the time stamp of all of the events referred to in a row is less than the time stamp of all of the events referred to in the next row of that or another portion of the display. That is, and looking at FIG. 308, the start time of all of the events for the function 306 are less than the start time for all of the events of function 308.

In alternative embodiments, it is possible to avoid generation of a globally-ordered list of nodes every time there is a change to the tree structure and invalidation of the mapping cache every time there is a change in the expansion state of the displayed tree. Instead such embodiments may rely on traversing the trace trees on the fly to look up nodes for output rows.

The principal benefit of embodiments which maintain the globally-ordered list is faster handling of incremental operations on either the trace tree (such as adding nodes or branches) or the output tree (such as expanding or collapsing nodes or 'folding' trees).

In embodiments which maintain the globally ordered list the tree nodes (or some data storage related to the tree node for the purpose of rendering a particular instance of a display of the tree) may have additional information provided in them, namely the number of currently visible descendents (e.g. 0 if unexpanded or a leaf node). This information is changed whenever descendents are added, removed or have observable expansion state changes.

Such storage also holds the aggregate minimum and maximum times covered by the nodes in order to save traversing branches to find out this information. This information is changed as descendent nodes are added and removed.

In these embodiments a traversal function to map output rows to nodes traverses each tree in parallel, keeping track of the current path through each tree as it goes. A count is kept of the current output row, starting at zero. Iteration proceeds until the desired output row has been reached.

For each iteration of the traversal function the tree whose next node to be checked has the earliest minimum timestamp is selected and the next highest minimum timestamp for all the current nodes across the other trees is noted. If the selected node's maximum timestamp is earlier than the noted next minimum timestamp then the selected node is considered to be the head of an isolated branch.

If the selected node is the head of an isolated branch then the total number of expanded descendents of the node is added to the current output row count; if the sum is less than the target row then this sum is the new current output row count, the selected tree's current node is advanced to the first available older sibling of the current node or its ancestors and iteration proceeds; if the sum is greater than the target row then the current node is advanced to the current node's youngest child and iteration proceeds.

If the selected node is not the head of an isolated branch, i.e. that the branch overlaps with some other nodes in another tree then the first descendent is selected (as above) and iteration proceeds. In other words, more fine-grained traversal is necessary where there are overlapping branches.

This algorithm performs most optimally the less overlap there is between nodes at all levels across all the trees which the method is aligning.

FIGS. 9 to 13 show a second example of the collapsing and expansion of functions to reveal the instructions going to make up those functions.

However, in FIGS. 9 to 13 a compact view has been used in which multiple nodes of the two trees can appear on the same row. Such an embodiment reduces the overall length of display that is needed to show the or each tree. For example, it can be seen that for ProcA the function afunc1 is shown on the same row as the function bfunc1 for ProcB.

In such embodiments, functions can be listed on the same row as long as none of the events of that function, such as a source code line, has a timestamp greater than any node in the following output row. However, the skilled person will appreciate that, although compact, such embodiments hide time ordering between nodes from different processors should those nodes appear on the same row. The time ordering is re-shown if that event is expanded.

In alternative embodiments the apparatus 100 may have M processors with only a sub-set N displayed on the display 202 in order to conserve screen real-estate and/or system resources when M is large. The set N may be chosen from the set of processors that have trace information available (set L). It is noted that it is possible for L=N=M to be valid.

Embodiments may allow the display to be actively varied, before, during and after collection of trace information. Embodiments, may allow a user to define how many columns will be shown on the display 202. This may be achieved using a text box or drop-down menu. The trace shown by the respective columns may be set and actively changed using scroll left and scroll right buttons such as those provided with a horizontal scroll bar and the processor core name or number.

Alternatively the user interface may use a drop-down-box or similar selection menu to enable selection of a specific processor. It is also possible to define groups of cores/processors so that trace from several processors can be added to the view together; it is possible to combine one or more groups with individual processor selections.

A further method of adding and arranging the processor columns in the tree view is to use a drag-and-drop mechanism. The order of the columns can be changed by dragging one or several before or after another column. Columns may also be added using right-click menus (or other selection mechanisms) associated with other processor related user interface parts in the user interface, such as a view showing a processor's stack frame or variables or similar. If no trace information is available for the selected processor then none is shown. When the column selection is changed the tree views are recalculated taking into account the changes in interleaving.

The skilled person will thus appreciate that various aspects of a Graphical User Interface (GUI) can be used to allow a user to manipulate the display.

Figures 13, 14:
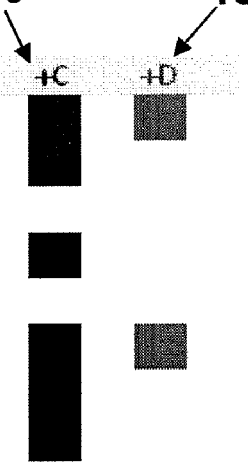
FIG. 13 shows a further view of the portion of the display as shown in FIGS. 9 to 12.
FIG. 14 shows a further embodiment of the invention.

FIG. 14 shows a further possible embodiment in which processors C and D have been added to the display 202 as columns 1300 and 1302. These are represented schematically as blocks and further information can be displayed if the columns are selected for expansion.

Embodiments of the invention may be displayed on any computer system with a customisable graphical user interface, e.g. Windows™ or UNIX like operating systems enhanced with the X windowing system and any platform where the AWT, SWT or Swing JAVA libraries can be used; essentially any operating system capable of supporting a rich or workstation-class graphical user interface. It could be realised using a custom windowing library by someone skilled in the art for any computer with a graphical or text-based display.

Reference to machine readable medium herein may comprise any of the following: a floppy disk, a CD ROM, a DVD ROM/RAM (including a -R/-RW and +R/+RW), EPPROM, FLASH Memory, a hard drive, a solid state memory (including a USB memory key, an SD card, a Memorystick™, a compact flash card, or the like), a tape, any other form of magneto optical storage, a transmitted signal (including an Internet download, an FTP transfer, etc), a wire, or any other suitable medium.

What we claim is:

1. A method of debugging multiple concurrent processes comprising:
    obtaining, from each process, a plurality of events that have been processed and, if no time information is associated with each event, associating time information therewith; and
    causing a display to display the events such that an event that has occurred in a first portion of the display associated with a first process at a first time is aligned with an event in a second portion of the display associated with a second process that has occurred at the first time;
    wherein events are collated into functions and wherein the method allows functions to be collapsed to hide the events therewithin and causes the display to display functions such that at least one of an event and a function that has occurred in the first portion of the display associated with the first process at the first time is aligned with at least one of an event and a function that has occurred in the second portion of the display associated with the second process that occurred at the first time.

2. The method of claim 1 wherein the multiple concurrent processes occur on a single processor.

3. The method of claim 1 wherein the multiple concurrent processes occur on a plurality of processors.

4. The method of claim 3 wherein events from a first of the processors are provided in the first portion of the display and events from a second of the processors are provided in the second portion of the display.

5. The method of claim 4 wherein the first and second portions of the display are columns thereof.

6. The method of claim 1 in which events are aligned by providing them on the same row of a display.

7. The method of claim 1 in which functions are aligned when the time stamp of any of the events of that function is less that the time stamp of all of the events referred to in the next row of that or another portion of the display.

8. The method of claim 1 in which functions are aligned when the time stamp of any of the events of that function is less than the time stamp of one of the function and the event shown in the next row of the portion of the display.

9. The method of claim 1 in which function can be expanded and collapsed to respectively reveal and hide the events therewith and in which the method aligns expanded functions such that events in the first and second portions that occurred are aligned with one another according to the time at which they occur.

10. The method of claim 1 which allows further columns to be added to represent events occurring in further processes.

11. The method of claim 1 wherein a portion of the display displays events which occur within a predetermined thread of events.

12. The method of claim 1 wherein a portion of the display displays events which occur in relation to a predetermined memory space.

13. The method of claim 1 wherein the first process and second process are the same.

14. A non-transitory computer readable medium encoded with instructions for a program configured for execution by a microprocessor to perform a method for debugging multiple concurrent processes, the program be arranged to:
    obtain, for each process, a plurality of events that have been processed and associate time information with each of the events;
    cause a display to display the events such that an event that has occurred in a first portion of the display associated with a first portion process at a first time is aligned with an event in a second portion of the display associated with a second process that has occurred at the first time; and
    collate events into functions from which they originate and allow functions to be collapsed to hide the events therewithin and cause the display to display functions such that at least one of an event and a function that has occurred in the first portion of the display associated with the first process at the first time is aligned with the at least one of an event and a function that has occurred in the second portion of the display associated with the second process that occurred at the first time.

15. The computer readable medium of claim 14 in which the program is further arranged to process events generated from multiple processes running on one of a single processor and a plurality of processors.

16. The computer readable medium of claim 15 in which the program is further arranged to cause events from a first of the processors to be provided in the first portion of the display and events from a second of the processors to be provided in the second portion of the display.

17. The computer readable medium of claim 14 which is further arranged to align functions when the time stamp of any of the events of that function is less than the time stamp of all of the events referred to in the next row of the portion of the display.

18. The computer readable medium of claim 14 which is further arranged to align functions when the time stamp of any of the events of that function is less than the time stamp of one of the functions and the events shown in the next row of the portion of the display.

19. A debugging system arranged to allow the debugging of multiple concurrent processes which comprises processing circuitry arranged to:
- obtain, from each process, a plurality of events that have been processed and associate time information therewith;
- cause a display to display the events such that an event that has occurred in a first portion of the display associated with a first process at a first time is aligned with an event in a second portion of the display associated with a second process that has occurred at the first time; and
- collate events into functions from which they originate and allow functions to be collapsed to hide the events therewithin and cause the display to display functions such that at least one of an event and a function that has occurred in the first portion of the display associated with the first process at the first time is aligned with the at least one of an event and a function that has occurred in the second portion of the display associated with the second process that occurred at the first time.

20. A method of debugging multiple concurrent processes comprising:
- obtaining, from each process, a plurality of events that have been processed and, if no time information is associated with each event, associating time information therewith; and
- causing a display to display the events such that an event that has occurred in a first portion of the display associated with a first process at a first time is aligned with an event in a second portion of the display associated with a second process that has occurred at the first time;
- wherein a portion of the display displays events which occur in relation to a predetermined memory space.

21. A non-transitory computer readable medium encoded with instructions for a program configured for execution on a microprocessor to perform a method for debugging multiple concurrent processes, the method comprising:
- obtaining, from each process, a plurality of events that have been processed and, if no time information is associated with each event, associating time information therewith; and
- causing a display to display the events such that an event that has occurred in a first portion of the display associated with a first process at a first time is aligned with an event in a second portion of the display associated with a second process that has occurred at the first time;
- wherein a portion of the display displays events which occur in relation to a predetermined memory space.

22. A method of debugging multiple concurrent processes comprising:
- obtaining, from each process, a plurality of events that have been processed and, if no time information is associated with each event, associating time information therewith; and
- causing a display to display the events such that an event that has occurred in a first portion of the display associated with a first process at a first time is aligned with an event in a second portion of the display associated with a second process that has occurred at the first time;
- wherein the first process and second process are the same.

23. A non-transitory computer readable medium encoded with instructions for a program configured for execution on a microprocessor to perform a method for debugging multiple concurrent processes, the method comprising:
- obtaining, from each process, a plurality of events that have been processed and, if no time information is associated with each event, associating time information therewith; and
- causing a display to display the events such that an event that has occurred in a first portion of the display associated with a first process at a first time is aligned with an event in a second portion of the display associated with a second process that has occurred at the first time;
- wherein the first process and second process are the same.

* * * * *